(12) United States Patent
Mizuno

(10) Patent No.: US 9,448,639 B2
(45) Date of Patent: Sep. 20, 2016

(54) CONTROLLER

(71) Applicant: Yoshiro Mizuno, Tokyo (JP)

(72) Inventor: Yoshiro Mizuno, Tokyo (JP)

( * ) Notice: Subject to any disclaimer, the term of this patent is extended or adjusted under 35 U.S.C. 154(b) by 275 days.

(21) Appl. No.: 14/364,625

(22) PCT Filed: Jun. 12, 2013

(86) PCT No.: PCT/JP2013/066279
§ 371 (c)(1),
(2) Date: Jun. 11, 2014

(87) PCT Pub. No.: WO2014/054313
PCT Pub. Date: Apr. 10, 2014

(65) Prior Publication Data
US 2014/0324197 A1    Oct. 30, 2014

(30) Foreign Application Priority Data

Oct. 1, 2012 (JP) .................................. 2012-219274
Jan. 16, 2013 (JP) .................................. 2013-005279

(51) Int. Cl.
| G06F 19/00 | (2011.01) |
| G06F 3/01  | (2006.01) |
| G08C 17/00 | (2006.01) |
| G05B 15/02 | (2006.01) |

(52) U.S. Cl.
CPC ............. *G06F 3/017* (2013.01); *G05B 15/02* (2013.01); *G08C 17/00* (2013.01)

(58) Field of Classification Search
USPC ...................................................... 700/17, 83
See application file for complete search history.

(56) References Cited

U.S. PATENT DOCUMENTS

| 8,238,876 B2* | 8/2012 | Teng ....................... H04M 1/67 455/411 |
| 8,593,421 B2* | 11/2013 | Krishnaswamy ... G06F 3/04847 345/173 |
| 9,170,644 B2* | 10/2015 | Jeon ........................ G06F 3/011 |
| 2010/0007913 A1* | 1/2010 | Manabe ................ G03G 21/02 358/1.15 |

FOREIGN PATENT DOCUMENTS

| JP | 04-137027 A | 5/1992 |
| JP | 07-105371 A | 4/1995 |
| JP | 08-112397 A | 5/1996 |
| JP | 09-102046 A | 4/1997 |
| JP | 11-025260 A | 1/1999 |
| JP | 2002-288640 A | 10/2002 |
| JP | 2003-346162 A | 12/2003 |
| JP | 2006-163662 A | 6/2006 |
| JP | 2008-016289 A | 1/2008 |
| JP | 2010-181968 A | 8/2010 |
| JP | 2012-185833 A | 9/2012 |
| WO | 2007/088939 A1 | 8/2007 |

\* cited by examiner

*Primary Examiner* — Kidest Bahta
(74) *Attorney, Agent, or Firm* — Enshan Hong; VLP Law Group LLP

(57) ABSTRACT

An objective of the present disclosure is to provide a highly reliable controller in which shapes that are not susceptible to false recognition are set as cue signs. The controller includes a control circuit which is implemented by a microcomputer or the like, an image sensor unit, and a memory. The control circuit is connected to a lighting controlling device of lighting equipment, a shade controlling device of a shade, and an air conditioning control device of an air conditioner through a communication link. A user can operate these pieces of equipment with a predetermined cue sign or an action with a predetermined cue sign.

18 Claims, 20 Drawing Sheets

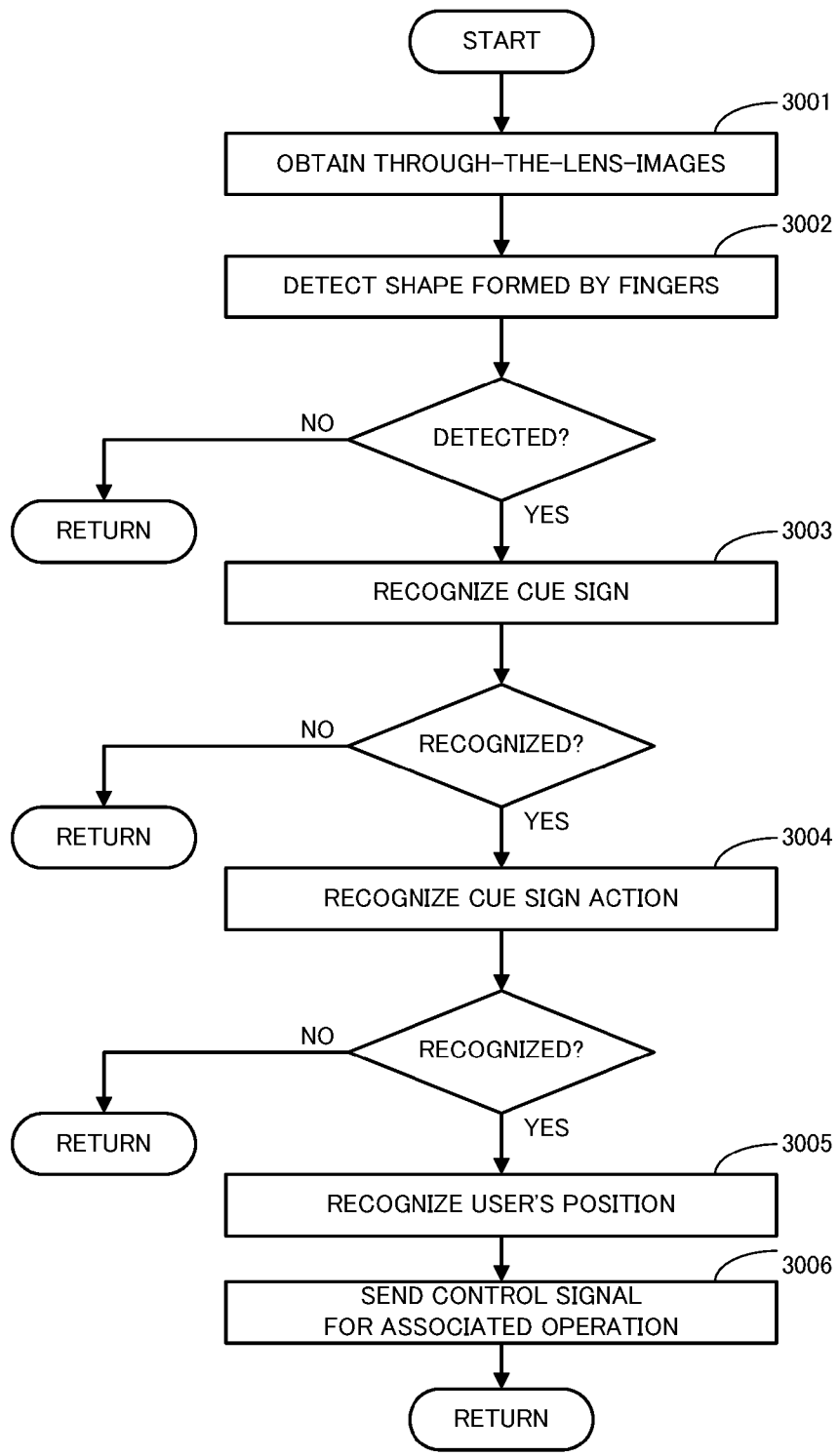

FIG. 4

| CUE SIGN NAME | BIOMETRICS ||
| --- | --- | --- |
| | SHAPE FORMED BY FINGERS | FEATURES OF SHAPE |
| RIGHT HAND PAPER SIGN | 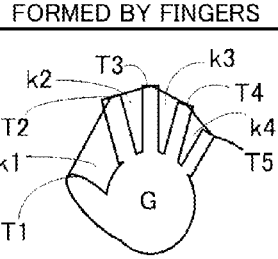 | PRESENCE OF INDENTATIONS: k1, k2, k3, k4 |
| | | PRESENCE OF TIPS: T1, T2, T3, T4, T5 |
| | | RELATIVE DISTANCES FROM CENTROID G TO TIPS: L1, L2, L3, L4, L5 |
| | | PRESENCE OF T1 SUCH THAT CORRESPONDING L1 IS SHORTEST |
| LEFT HAND PAPER SIGN | 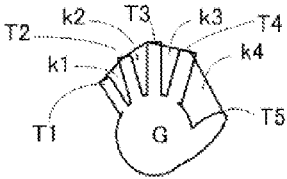 | PRESENCE OF INDENTATIONS: k1, k2, k3, k4 |
| | | PRESENCE OF TIPS: T1, T2, T3, T4, T5 |
| | | RELATIVE DISTANCES FROM CENTROID G TO TIPS: L1, L2, L3, L4, L5 |
| | | PRESENCE OF T5 SUCH THAT CORRESPONDING L5 IS SHORTEST |

FIG. 5

| USER'S POSITION (5001) | CUE SIGN ACTION (5002) | ASSOCIATED OPERATION (5003) | |
|---|---|---|---|
| IN FRONT OF ENTRANCE | RIGHT HAND PAPER SIGN: WAVE | TURN ON LIGHTING | 5004 |
| | RIGHT HAND PAPER SIGN: SWEEP UPWARD | TURN UP LIGHTING | 5005 |
| | RIGHT HAND PAPER SIGN: SWEEP DOWNWARD | TURN DOWN LIGHTING | 5006 |
| | LEFT HAND PAPER SIGN: WAVE | TURN ON AIR CONDITIONER | |
| | LEFT HAND PAPER SIGN: SWEEP UPWARD | INCREASE WIND STRENGTH | |
| | LEFT HAND PAPER SIGN: SWEEP DOWNWARD | DECREASE WIND STRENGTH | |
| | COMBINATION OF BOTH HAND PAPER SIGNS | POWER OFF ALL EQUIPMENTS | |
| BEHIND ENTRANCE | RIGHT HAND PAPER SIGN: SWEEP UPWARD | ROLL UP SHADE | 5007 |
| | RIGHT HAND PAPER SIGN: SWEEP DOWNWARD | ROLL DOWN SHADE | 5008 |

5000

| CUE SIGN ACTION (5011) | ASSOCIATED OPERATION (5012) | |
|---|---|---|
| RIGHT HAND PAPER SIGN: WAVE | TURN ON LIGHTING | 5013 |
| RIGHT HAND PAPER SIGN: SWEEP UPWARD | TURN UP LIGHTING | 5014 |
| RIGHT HAND PAPER SIGN: SWEEP DOWNWARD | TURN DOWN LIGHTING | 5015 |
| COMBINATION OF BOTH HAND PAPER SIGNS | POWER OFF | 5016 |

5010

| CUE SIGN ACTION (5021) | ASSOCIATED OPERATION (5022) | |
|---|---|---|
| RIGHT HAND PAPER SIGN: SWEEP UPWARD | ROLL UP SHADE | 5023 |
| RIGHT HAND PAPER SIGN: SWEEP DOWNWARD | ROLL DOWN SHADE | 5024 |

5020

| CUE SIGN ACTION (5031) | ASSOCIATED OPERATION (5032) | |
|---|---|---|
| LEFT HAND PAPER SIGN: WAVE | TURN ON AIR CONDITIONER | 5033 |
| LEFT HAND PAPER SIGN: SWEEP UPWARD | INCREASE WIND STRENGTH | 5034 |
| LEFT HAND PAPER SIGN: SWEEP DOWNWARD | DECREASE WIND STRENGTH | 5035 |
| COMBINATION OF BOTH HAND PAPER SIGNS | POWER OFF | 5036 |

| CUE SIGN ACTION | ASSOCIATED OPERATION |
| --- | --- |
| RIGHT HAND PAPER SIGN: WAVE | RELEASE |
| RIGHT HAND PAPER SIGN: SWEEP UPWARD | ZOOM UP |
| RIGHT HAND PAPER SIGN: SWEEP DOWNWARD | ZOOM DOWN |
| LEFT HAND PAPER SIGN: WAVE | TURN ON SPEAKER |
| LEFT HAND PAPER SIGN: SWEEP UPWARD | INCREASE SOUND VOLUME |
| LEFT HAND PAPER SIGN: SWEEP DOWNWARD | DECREASE SOUND VOLUME |
| COMBINATION OF BOTH HAND PAPER SIGNS | POWER OFF |

FIG. 9
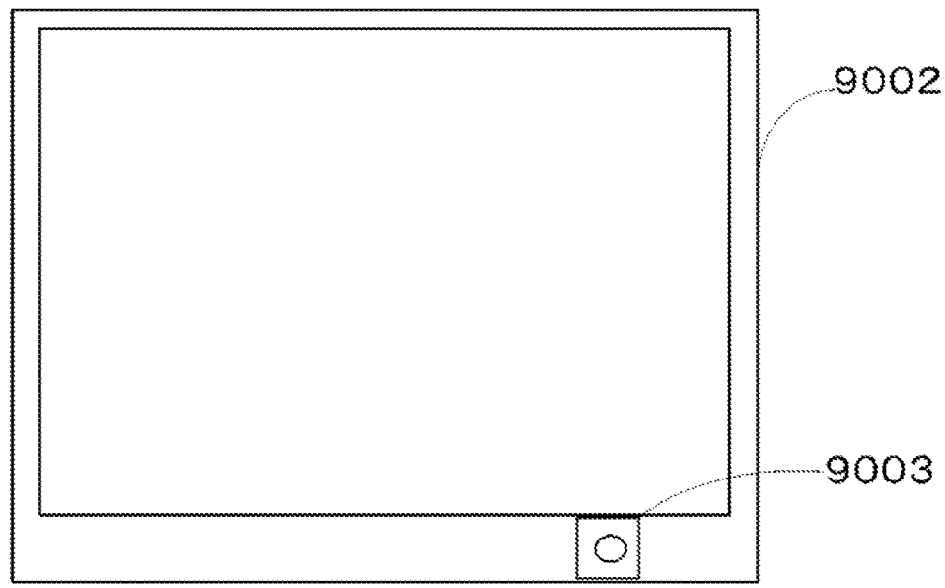
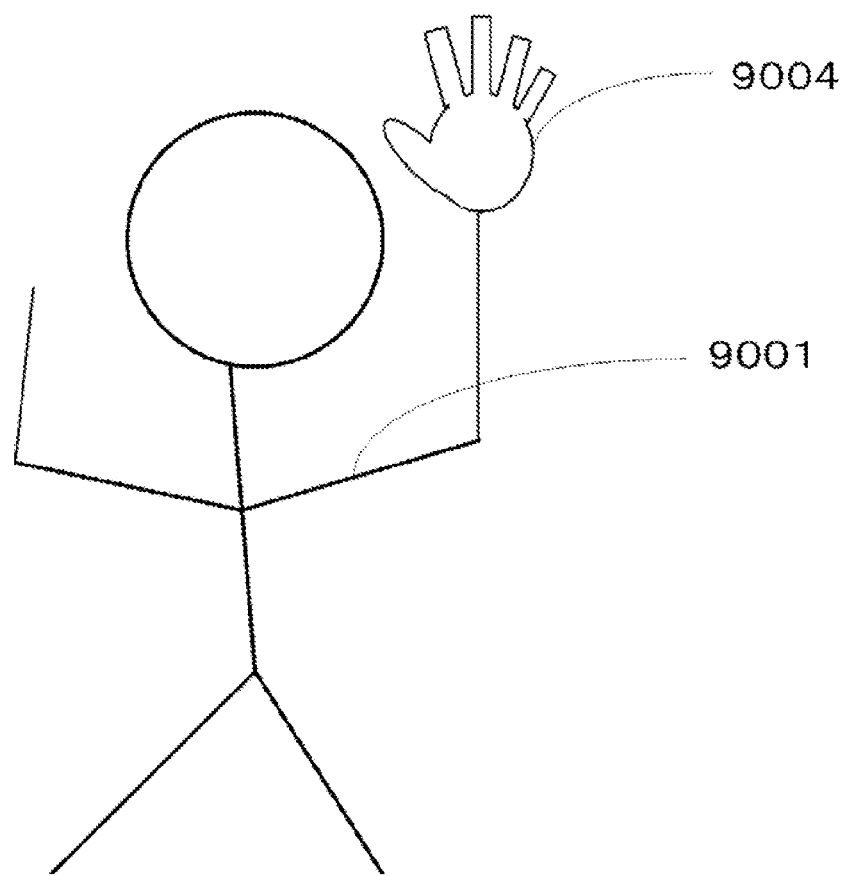

FIG. 11

| CUE SIGN ACTION | ASSOCIATED OPERATION |
|---|---|
| RIGHT HAND PAPER SIGN: WAVE | POWER ON |
| RIGHT HAND PAPER SIGN: SWEEP UPWARD | CHANNEL UP |
| RIGHT HAND PAPER SIGN: SWEEP DOWNWARD | CHANNEL DOWN |
| LEFT HAND PAPER SIGN: WAVE | TURN OFF SPEAKER |
| LEFT HAND PAPER SIGN: SWEEP UPWARD | INCREASE SOUND VOLUME |
| LEFT HAND PAPER SIGN: SWEEP DOWNWARD | DECREASE SOUND VOLUME |
| COMBINATION OF BOTH HAND PAPER SIGNS | POWER OFF |

FIG. 14

| DIRECTION | CUE SIGN | ASSOCIATED OPERATION |
|---|---|---|
| FROM CENTER | LEFT HAND PAPER SIGN | START WHITE'S TIMER |
| FROM WHITE'S SIDE | RIGHT HAND PAPER SIGN | STOP WHITE'S TIMER AND START BLACK'S TIMER |
| FROM BLACK'S SIDE | RIGHT HAND PAPER SIGN | STOP BLACK'S TIMER AND START WHITE'S TIMER |

FIG. 16

| CUE SIGN NAME | BIOMETRICS ||
|---|---|---|
| | SHAPE FORMED BY FINGERS | FEATURES OF SHAPE |
| RIGHT HAND PAPER SIGN | (figure) | PRESENCE OF INDENTATIONS: k1, k2, k3, k4 |
| | | PRESENCE OF TIPS: T1, T2, T3, T4, T5 |
| | | INTERIOR ANGLES BETWEEN FINGERS: θ1, θ2, θ3, θ4 |
| | | PRESENCE OF T1 SUCH THAT CORRESPONDING θ1 IS LARGEST |
| LEFT HAND PAPER SIGN | (figure) | PRESENCE OF INDENTATIONS: k1, k2, k3, k4 |
| | | PRESENCE OF TIPS: T1, T2, T3, T4, T5 |
| | | INTERIOR ANGLES BETWEEN FINGERS: θ1, θ2, θ3, θ4 |
| | | PRESENCE OF T5 SUCH THAT CORRESPONDING θ4 IS LARGEST |

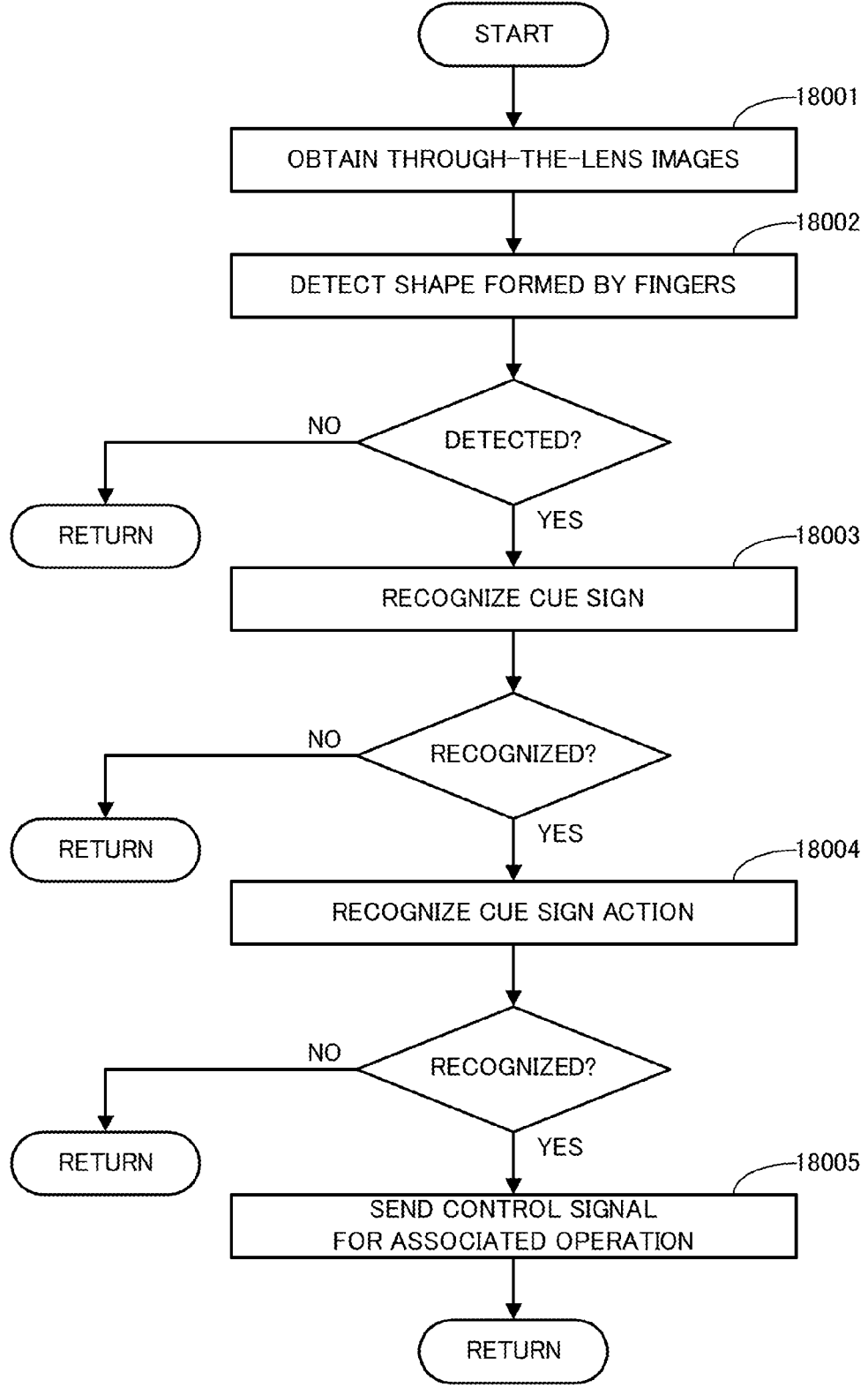

FIG. 19

| CUE SIGN NAME | BIOMETRICS | |
|---|---|---|
| | SHAPE FORMED BY FINGERS | FEATURES OF SHAPE |
| RIGHT HAND PAPER SIGN | 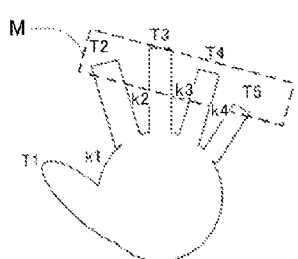 | PRESENCE OF INDENTATIONS: k1, k2, k3, k4 — 19005 |
| | | PRESENCE OF TIPS: T1, T2, T3, T4, T5 — 19006 |
| | | T2, T3, T4 AND T5 HAVING DISTRIBUTION PATTERN M — 19007 |
| | | PRESENCE OF T1 LOCATED AT SIDE EDGE AND DEVIATING FROM DISTRIBUTION PATTERN M TOWARD INTERIOR — 19008 |
| LEFT HAND PAPER SIGN | 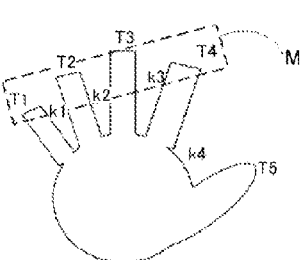 | PRESENCE OF INDENTATIONS: k1, k2, k3, k4 — 19009 |
| | | PRESENCE OF TIPS: T1, T2, T3, T4, T5 — 19010 |
| | | T1, T2, T3 AND T4 HAVING DISTRIBUTION PATTERN M — 19011 |
| | | PRESENCE OF T5 LOCATED AT SIDE EDGE AND DEVIATING FROM DISTRIBUTION PATTERN M TOWARD INTERIOR — 19012 |

19001, 19003, 19002, 19004

CONTROLLER

PRIORTY CLAIM

This is a U.S. national stage of application No. PCT/JP2013/066279, filed on Jun. 12, 2013. Priority is claimed on the following applications: Country: Japan, Application No.:2012-219274, Filed: Oct. 1, 2012; Country: Japan, Application No.: 2013-005279, Filed: Jan. 16, 2013, the content of which is/are incorporated here by reference

TECHNICAL FIELD

The present invention relates to a controller for various electric appliances, information terminals, indoor and outdoor equipment, game clocks and the like and, in particular, to a controller using an image sensor.

BACKGROUND ART

To operate a typical controller for various electric appliances, information devices, indoor or outdoor equipment or the like, a user need to directly touch the controller. Specifically, a user needs to perform operations such as pressing, turning or moving buttons, icons or the like on a controller equipped with such buttons, icons or the like.

A remote control for remotely operating equipment allows a user to operate the equipment to be operated without directly touching the equipment. However, the user needs to directly touch the remote control equipped with buttons, icons, or the like to operate the remote control.

In board games such as go, shogi, and chess, a game clock is used for measuring the time each player takes for considering a move. A controller for a game clock is a device including buttons or the like to be directly touched by the players. In a game, each player needs to operate by directly touching a button or the like on the controller every time the player completes a move (which refers to placing a go stone on the game board or moving a go stone, a shogi or chess piece or the like on the game board). The time one player takes for considering a move is the time that elapses between the operation performed by the other player and the next operation performed by the former.

As a type of controller that is operated without a user's direct touch, a controller using a motion sensor is known. When the controller detects a motion of a person in the room, the controller turns on; when the controller no longer detects a motion, the controller turns off. However, controlling by a controller of this type is limited to the simple on-off operation controls of equipment such as lighting equipment.

A method has been proposed in the technical field of digital camera in which a built-in controller of a camera analyzes an image captured with an image sensor and, when the controller recognizes a predetermined shape, the controller performs a predetermined operation control. Specifically, a shape formed by a user with a hand and fingers (hereinafter referred to as a finger pose) within an image capturing range is set in a controller as a cue sign for initiating a predetermined operation. However, the method has a problem concerning an appropriate selection of a finger pose and a problem that quick recognition and avoidance of false recognition cannot be achieved at the same time. Patent Literature 1 described below discloses a technique using such a method.

CITATION LIST

Patent Literature

FIG. 3C of Patent Literature 1 illustrates a camera control apparatus that recognizes shapes formed by fingers such as a paper sign and a scissors sign. The specification of Patent Literature 1 discloses finger shape recognition means for recognizing a shape formed by fingers and a control method in which a pose made with fingers is compared with a registered pose and, if they substantially match, a predetermined operation of a camera is performed.

However, the user needs to carefully form a shape with a hand in order to avoid false recognition because in this method, various shapes are set as poses to be recognized Accordingly, a problem with the method is that it is troublesome for the user to make a pose.

Furthermore, poses that are not suitable for finger shape recognition, such as raising a forefinger, are also chosen as poses to be recognized. Studies by the present inventor have shown that finger-formed shapes that have projections and indentations are less susceptible to false recognition. Judging from the viewpoint of whether projections and indentations appear or not, the pose of raising a forefinger chosen in Patent Literature 1 has only a projection and does not have an indentation and it can be said that the choice of pose to be recognized is not appropriate. Patent Literature 1: Unexamined Japanese Patent Application Kokai Publication No. 2010-18968.

A controller for a game timer described in Patent Literature 2 includes a fixed number of magnets attached to the backside of a game board and go stones or tame pieces or the like on which iron is attached or in which iron is embedded. The controller uses the magnetic force of the magnets to allow the magnets to function as switches and detects a move so that the time elapses between the appearances of detection signals can be measured.

However, the controller has a problem that elements for detecting moves need to be attached to or otherwise provided in the game board and the go stones or game pieces or the like.

Patent Literature 2: Unexamined Japanese Patent Application Kokai Publication No. H8-112397.

SUMMARY OF INVENTION

Technical Problem

The technique disclosed in Patent Literature 1 lacks the consideration on shapes to be recognized by the controller. Setting an inappropriate shape as a cue sign can lead to false recognition. The objective of the present disclosure is to provide a highly reliable controller in which a shape less susceptible to false recognition is set as a cue sign.

Another objective is to choose a cue sign shape that an ordinary user can form with the user's hand without trouble.

Further, another objective is to provide a controller including a recognition algorithm that is capable of recognizing a cue sign with reasonable resources and time.

Yet another objective is to provide a controller that functions in an environment, such as in darkness, where it is difficult for an ordinary image sensor to obtain an image that captures the shape formed by fingers.

Furthermore, another objective is to provide a controller capable of measuring the consideration time without the need for players of a board game to directly touch a button or the like on a game timer and which does not require attachment of elements to the game board, go stones, game pieces or the like.

Solution to Problem

The present inventor has intensively studied the problems stated above and has developed a controller for which the pose of a paper sign, which is one of the shapes formed by fingers having projections and indentations, is chosen as a shape to be recognized To achieve the objectives of the present disclosure, according to a first aspect of the present disclosure, there is provided an apparatus that is a controller connected to an image sensor, the controller including:

(a) reference data including four indentations each of which is formed between extended fingers, a positional relation between the extended fingers that represent projections, and a feature relating to the thumb which are set as biometrics of fingers forming a preselected shape of an open hand with all of the fingers and the thumb extended (hereinafter, the preselected shape is referred to as a cue sign);
(b) association storage means for associating the cue sign with a predetermined operation of equipment to be controlled and storing the association;
(c) recognition means for
analyzing, at predetermined intervals, images (hereinafter, the images are referred to as through-the-lens-images) successively generated by the image sensor to detect a shape formed by fingers,
detecting, in the shapes, indentations each of which is formed between extended fingers, a positional relation between the extended fingers that represent projections, and a feature relating to the thumb, and including the indentations,
comparing the indentations, the positional relation and the feature with the biometrics included in the reference data to recognize the cue sign; and
(d) control means for, in response to the recognition of the cue sign, referring to the association storage means to emit a control signal for the predetermined operation associated with the recognized cue sign at a predetermined timing.

The term biometrics as used herein refers to information concerning physical human characteristics that can be handled by a computer as data having a predetermined format.

The shape of a paper sign includes projections and indentations which are suitable for pattern recognition. Choosing this shape has the effect of reducing resources required for recognition and recognition time. Among various shapes that have been studied in the field of gesture recognition, the shape of a paper sign has a significant effect of improving recognition when a recognition program using features relating to the thumb is chosen because the thumb, which has features that can be readily identified, is clear in the shape of a paper sign.

The predetermined timing may be a timing after the recognition and at which the recognition is no longer sensed.

If the time of recognition of a cue sign is to be set as the timing of control, the controller will not be easy to use for the user because there is a delay in recognition due to external factors. It will be difficult to perform control at the moment that the user desires. On the other hand, a delay is very unlikely to occur at a moment after recognition and at which the recognition is no longer sensed. Therefore, the setting of the timing has the effect of allowing the controller to stably perform a control at a timing close to the timing intended by the user by changing the shape of the cue sign or pulling the fingers away from the image capturing range at the moment when the user wants to control.

The positional relation may be a relative relation obtained by measuring a relative distance from a predetermined position to the tip of each of the fingers and the thumb on an image, and the comparison in the controller may include the step of determining whether or not a difference between the positional relation of a shape in which the relative relation between the distances is detected and a relative positional relation included in the biometrics is within a preset range.

In the shape of a paper sign, the tips of the fingers and the thumb are in a certain positional relation with respect to one another. The controller is able to determine whether or not there is a feature of a paper sign by determining a reference position by, for example, extracting edges of the palm using a known shape detection method and obtaining the centroid of the palm, and determining the distance or relative distance from the position to each fingertip.

The predetermined position may be the centroid of the cue sign.

The feature of the thumb may be that the relative distance from the centroid of the cue sign to the tip of the thumb is the shortest among the other relative distances.

The positional relation may be an interior angle between the thumb and the forefinger, an interior angle between the forefinger and the middle finger, an interior angle between the middle finger and the ring finger, and an interior angle between the ring finger and the little finger.

Using whether the difference between each interior angle included in the reference data and each interior angle obtained by analyzing the shape of a hand extracted from a through-the-lens-image is within a predetermined range as an indicator of whether there is a positional relation specific to a cue sign has the effect of achieving accurate and fast recognition by the controller.

The feature of the thumb may be that the interior angle between the thumb and the forefinger is greater than the other interior angles.

The association with a predetermined operation of the equipment to be controlled may be association of the predetermined operation with at least one action selected from the group including the action of waving the cue sign, the action of sweeping the cue sign in a predetermined direction, and a combination of the cue signs formed with both hands.

In the controller, the biometrics may include a feature of a right hand cue sign and a feature of a left hand cue sign, the recognition may include the step of determining whether the hand is a right hand or left hand, and the right hand cue sign and the left hand cue sign may be associated with different operations in the association with a predetermined operation of the equipment to be controlled.

There is a limit to the number of shapes that can be formed by a hand which are suitable for recognition. By differentiating between the right and left hands, the number of cue signs can be increased. As a result, the variety of pieces of equipment and operations that can be controlled is increased.

The controller may be a volume controller controlling at least one volume selected from the sound volume of a speaker, the color or the amount of light of lighting equipment, the temperature, the humidity or the wind strength of an air conditioner, the amount of opening of a curtain, a shade or a window, and the reclining angle of a chair. The volume may be increased or decreased along with the action of sweeping.

The equipment to be controlled by the controller may be at least one selected from the group including a television set, a radio, a game machine, a digital camera and a mobile phone with built-in camera.

The controller may perform at least one indoor or outdoor equipment control selected from the group including opening and closing a door, locking and unlocking a door lock, answering a telephone, a video phone or an intercom, calling an elevator, and turning on and off a ventilator.

The controller may include change means for changing equipment to control in accordance with the position of a user with respect to the image sensor.

The equipment to be controlled by the controller may be a game clock for at least one board game selected from the group including chess, shogi and go.

An image capturing area of the image sensor may be preset to include a board for the board game.

The predetermined operation may be associated according to the direction from which a hand forming the cue sign appears in the image capturing area.

The predetermined operation may be associated according to the direction from which a hand forming the cue sign appears above the board.

The controller may be a controller connected to a thermal image sensor. The analysis and the detection of the shape formed by fingers at the predetermined intervals may be performed on a thermal image.

The thermal image sensor is capable of obtaining an image that clearly captures the shape formed by fingers even in darkness. Since the thermal image sensor works regardless of the brightness in a place where the controller is used, the use of the thermal image sensor has the effect of increasing the range of places and environments in which the controller can be used.

Furthermore, since the difference in temperature between the background and fingers forming a cue sign is large in an ordinary environment, the shape formed by the fingers can readily be separated from the background. This has the effect of achieving accurate and fast recognition by the controller.

BRIEF DESCRIPTION OF DRAWINGS

FIG. 3 is a flowchart illustrating an operation of a controller provided on a wall;

FIG. 4 is a diagram illustrating data structure of biometrics;

FIG. 5 is a diagram illustrating an association data structure;

FIG. 8 is a diagram illustrating a data structure of an association storage relating to a second embodiment;

FIG. 9 is a conceptual drawing of a user operating a television set of the present disclosure;

FIG. 11 is a diagram illustrating a data structure of an association storage according to a third embodiment;

FIG. 14 is a diagram illustrating a data structure of an association storage according to a forth embodiment;

FIG. 16 is a diagram illustrating a data structure of another biometrics;

FIG. 18 is a flowchart illustrating an operation of a controller provided for each apparatus;

FIG. 19 is a diagram illustrating a data structure of biometrics; and

DESCRIPTION OF EMBODIMENTS

Figure 1:
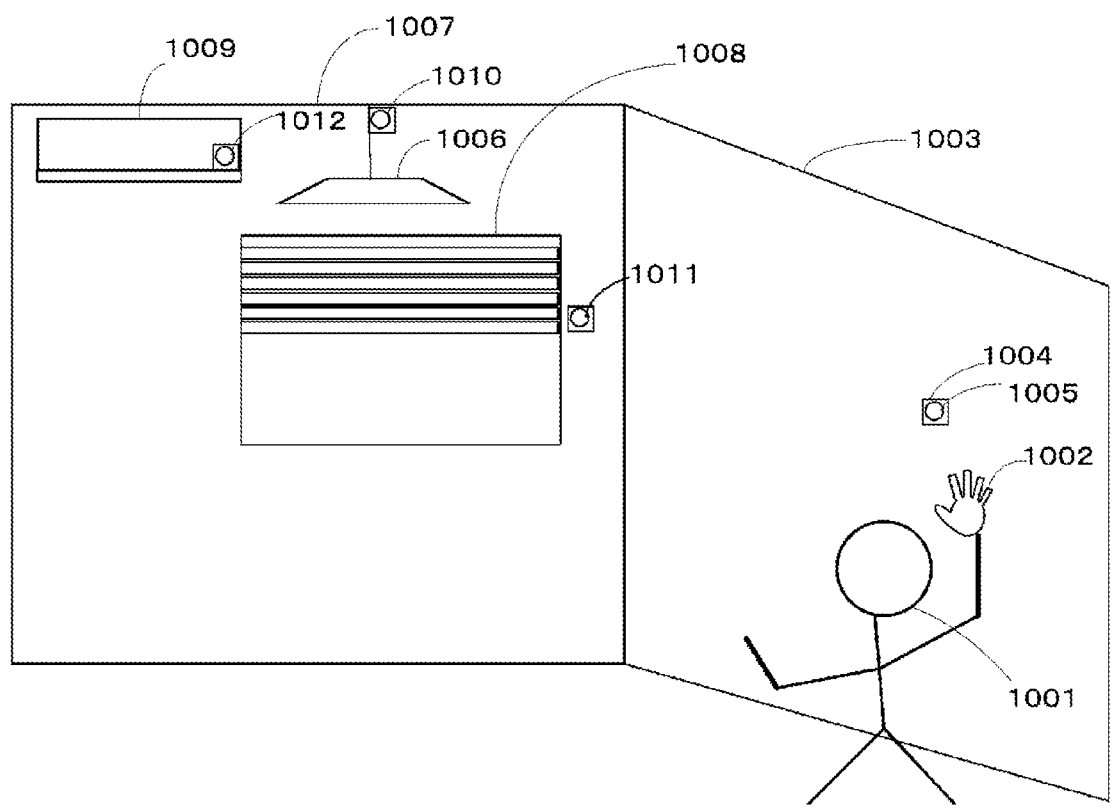
FIG. 1 is a conceptual diagram of a room equipped with controllers.

Examples of the present disclosure will be described by way of embodiments with reference to the drawings.
First Embodiment FIG. 1 is a conceptual diagram of a room equipped with controllers of the present disclosure. A user 1001 is at the entrance of the room. In the situation illustrated in the figure, the user 1001 directs fingers 1002 to a controller 1004 provided on a sidewall 1003 and is waving the hand in the shape of a paper sign. The controller 104 is provided with an image sensor unit 1005, which is generating images at predetermined intervals.

Lighting equipment 1006 is provided on the ceiling. A window is provided in the wall 1007 facing the entrance. A shade 1008 including an electrical roll-up function is provided at the window. An air conditioner 1009 is provided at the top of the wall facing the entrance. 1010 denotes a controller provided for the lighting equipment. The controller includes an image sensor unit. The user 1001 can operate the equipment with a predetermined cue sign or by performing an action with a predetermined cue sign toward the sensor unit.

1011 denotes a controller provided for the shade and includes an image sensor unit. The user 1001 can operate the equipment with a predetermined cue sign or by performing an action with a predetermined cue sign toward the sensor unit.

1012 denotes a controller provided for the air conditioner and includes an image sensor unit. The user 1001 can operate the air conditioning equipment with a predetermined cue sign or by performing an action with a predetermined cue sign toward the sensor unit.

Furthermore, these pieces of equipment or facilities are connected to a controller 1004 through a communication link.

Figure 2:
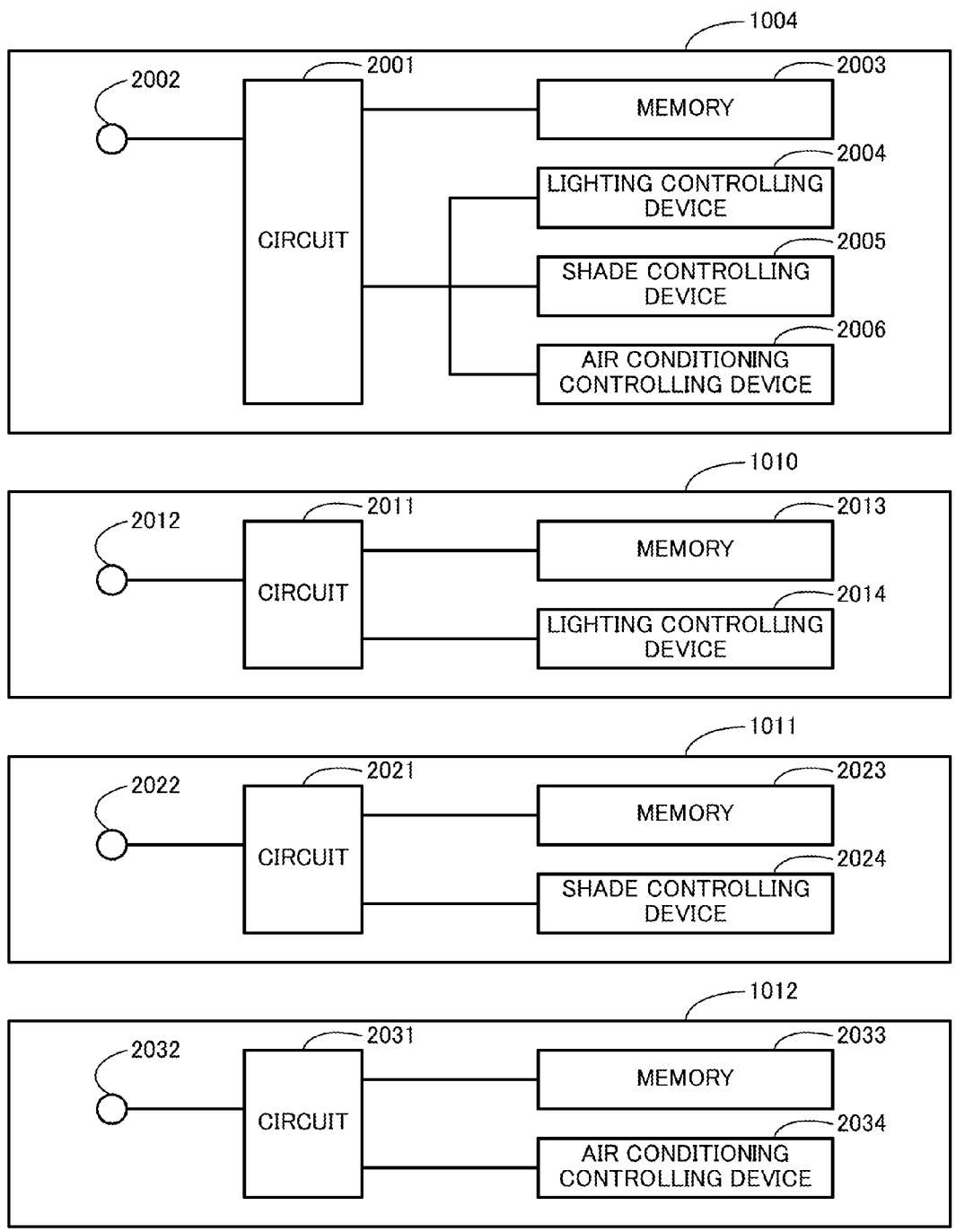
FIG. 2 is a block diagram illustrating controllers and control devices of pieces of equipment to be controlled.

FIG. 2 s a block diagram illustrating the four controllers 1004, 1010, 1011 and 1012 that control different pieces of equipment or facilities.

The controller 1004 includes a control circuit 2001 implemented by a microcomputer or the like, an image sensor unit 2002, a memory 2003, a lighting controlling device 2004 for the lighting equipment 1006, a shade controlling device 2005 for the shade 1008, and an air conditioning controlling device 2006 for the air conditioner 1009.

The controller 1010 includes a control circuit 2011 implemented by a microcomputer or the like, an image sensor unit 2012, a memory 2013 and a lighting controlling device 2014 for the lighting equipment 1006.

The controller 1011 includes a control circuit 2021 implemented by a microcomputer or the like, an image sensor unit 2022, a memory 2023 and a shade controlling device 2024 for the shade 1008.

The controller 1012 includes a control circuit 2031 implemented by a microcomputer or the like, an image sensor unit 2032, a memory 2033 and an air conditioning controlling device 2034 for the air conditioner 1009.

The operations of each of the controllers given above is implemented by a preinstalled control program such as firmware being executed by a processor in the control circuit and cooperating with devices such as the image sensor unit. The programs are recorded on a computer-readable recording medium, are read from the recording medium by the processors, and are executed in response to an operation by the user of the controllers or a signal from devices constituting the controllers.

FIG. 3 is a flowchart illustrating an operation of the controller 1004. When the controller 1004 is turned on, the program implementing the operation of the controller is executed and the image sensor unit and the control devices of the equipment to be controlled are activated to start the operation.

At step 3001, through-the-lens images generated by the image sensor unit are obtained at predetermined intervals.

Then at step 3002, the controller performs detection of a shape formed by fingers from the obtained through-the-lens images. The detection of the shape formed by fingers is performed accordingly by using a well-known analysis method such as skin color pattern matching through analysis of color components in the image or edge extraction. Note that the detection of the shape formed by fingers includes the step of analyzing a plurality of through-the-lens images generated within a predetermined period of time and complementing a plurality of results of the analysis with one another.

Determination is made as to whether there is a shape formed by fingers and when the determination is "No", the operation returns; when the determination is "Yes", the operation of the controller proceeds to step 3003.

At step 3003, the controller performs recognition of a cue sign preregistered in the memory 2003.

The recognition of the cue sign is accomplished by the controller executing the following steps. First, there is the step of extracting indentations, which are features of the detected shape formed by fingers, the tips of extended fingers, and the centroid of the shape, followed by the step of measuring the distance between the centroid and each of the tips on the image to extract relative distances. Then, there is the step of comparing the shape with biometrics of a cue sign stored in a cue sign storage provided in the memory 2003. When the comparison shows that the detected shape formed by fingers is within a preset matching level range, recognition of the cue sign is successful.

Note that the detection of the shape formed by fingers includes the step of analyzing a plurality of through-the-lens images generated within a predetermined period of time and complementing a plurality of results of the analysis with one another.

FIG. 19 is a diagram illustrating a data structure of biometrics stored in the cue sign storage provided in the memory 2003. The right and left in the terms "right hand paper sign" and "left hand paper sign" used herein are determined based on the shapes of the hands viewed from the back of the hands.

The cue sign data includes two major structure parts: cue sign name 19001 and biometrics 19002. The biometrics includes finger shape model 19003 and features of the shapes 19004.

Features of a shape used for comparison of a right hand paper cue sign are "the presence of four indentations (k1, k2, k3, k4)" as indicated in 19005, "the presence of five tips (T1, T2, T3, T4, T5)" representing projections of the shape of the hand as indicated in 19006, "tips (T1, T2, T3, T4, T5) having a certain distribution pattern M" as indicated in 19007, and "the presence of tip T1 located at a side edge and deviating from the distribution pattern M toward the interior", as indicated in 19008.

The distribution pattern M is a region indicated by a dashed rectangle in each of the finger shape models 19003. The region can be represented by a regression line and the width of a deviation from the regression line. The regression line can be extracted by applying an existing search program to the clump of tips distributed in the image. The term "side edge" in 19008 refers to the edge of a side of the shape model when the direction from which the fingers extend is upward. The term "interior" in 19008 refers to the region where, out of the two regions divided by the regression line, a greater part of the shape of the hand exists.

The positional relation between the extended fingers and thumb which represent projections in the right hand paper sign shape is represented by "the presence of five tips (T1, T2, T3, T4, T5) representing the projections of the shape of hand" and " tips (T1, T2, T3, T4, T5) having a certain distribution pattern M". The feature of the thumb in the right hand paper sign shape is represented by "the presence of tip T1 located at a side edge and deviating from the distribution pattern M toward the interior".

The features of the shape of the left hand paper sign, which are indicated in 19009 to 19012, are the same as the features of the right hand paper sign except that the features of the left hand paper sign are the mirror image of the features of the right hand paper sign.

The data structure of biometrics stored in the cue sign storage provided in the memory 2003 can be represented in various forms.

FIG. 4 illustrates a data structure of biometrics represented in another form.

The cue sign data includes two major structures: cue sign name 40001 and biometrics 40002. The biometrics includes finger shape models 40003 and features of the shapes 40004.

Features of a shape used for comparison of a right hand paper sign are the presence of four indentations (k1, k2, k3, k4), as indicated in 4005, the presence of five tips (T1, T2, T3, T4, T5) representing the fingertips as indicated in 4006, that relative distances (L1, L2, L3, L4, L5) from the centroid G to the tips of the fingers measured on the image are in a predetermined relation as indicated in 4007, and the presence of T1 such that corresponding L1 is the shortest among the relative distances as indicated in 4008.

The positional relation between the extended fingers and thumb, which represent projections, is represented by "the presence of five tips (T1, T2, T3, T4, T5) representing the fingertips" and "the relative distances (L1, L2, L3, L4, L5) from the centroid G to the tips of the fingers measured on the image are in a predetermined relation". In addition, the feature of the thumb in the paper sign shape is represented by "the presence of T1 such that corresponding L1 is the shortest among the relative distances".

The features of the shape of the left hand paper sign, which are indicated in 4009 to 4012, are the same as the features of the right hand paper sign except that the features of the left hand paper sign are the mirror image of the features of the right hand paper sign.

The relative distances Lx may be measured from any chosen point specific to the shape, rather than from the centroid.

FIG. 16 illustrates a data structure in another form that can be used as a data structure of biometrics.

The cue sign data includes two major structures: cue sign name 16001 and biometrics 16002. The biometrics includes finger shape models 16003 and features of the shapes 16004.

Features of a shape used for comparison of a right hand paper cue sign are the presence of four indentations (k1, k2, k3, k4) as indicated in 16005, the presence of five tips (T1, T2, T3, T4, T5) representing the fingertips as indicated in 16006, the interior angles between the fingers ($\theta 1$, $\theta 2$, $\theta 3$, $\theta 4$) being within a predetermined range as indicated in 16007, and the presence of T1 such that corresponding interior angle $\theta 1$ is the largest as indicated in 16008.

The features of the shape of the left hand paper sign, which are indicated in 16009 to 16012, are similar to those of the right hand paper sign. Since the shape of the left hand paper sign is the mirror image of the shape of the right hand paper sign, the feature of the thumb used is the presence of T5 such that corresponding $\theta 4$ is the largest, as indicated in 16012.

The interior angles used here are measured interior angles formed by lines linking the fingertips and the centroid G ($\angle T1GT2$, $\angle T2GT3$, $\angle T3GT4$, $\angle T4GT5$) as illustrated in the shape models in 16003. However, other angles may be used accordingly such as the angles formed by the intersecting center lines of the fingers. The positional relation between the extended fingers and thumb, which represent projections, may include the angle between the lines linking the tips. The angle in the shape model 16003 is the angle formed by lines T1T2 and T2T3, the angle formed by lines T2T3 and T3T4, or the angle formed by lines T3T4 and T4T5.

The features of the shapes used in the comparison here are not limited to the features in this embodiment; any features that indicate indentations, the positional relation between the extended fingers and thumb representing indentations, and a feature indicating the thumb in the paper sign shape may be used as appropriate.

Referring back to the flowchart of FIG. 3, the description will be continued below. When the cue sign recognition is not successful, the controller determines that there is no cue sign in the through-the-lens image and the operation of the controller returns to the start. When the cue sign recognition is successful and the controller determines that there is a cue sign, the operation of the controller proceeds to step 3004. At step 3004, the controller performs recognition of a predetermined action of the cue sign stored in an association storage provided in the memory 2003. Detection of an action by the controller is performed accordingly using a well-known method, such as analysis of an optical flow in a skin color region or detection of movement of the centroid of the cue sign recognized in through-the-lens images. The controller compares the detected cue sign action with a cue sign action stored in the memory. When the controller determines that the detected cue sign action matches the cue sign in the memory within a predetermined matching level range, the cue sign action recognition is successful.

When the controller does not recognize a cue sign action, the operation of the controller returns to the start. When the controller recognizes a cue sign operation, the operation of the controller proceeds to step 3005. At step 3005, the controller performs recognition of the position of the user.

The recognition of the position of the user is accomplished by the controller recognizing the direction of the fingers forming the cue sign with respect to the four sides defining the image capturing area of the image sensor unit. The controller is configured so that when the controller recognizes fingers of the cue sign extending from the right side (the side facing the interior of the room) of the image area, the controller recognizes that the position of the user is behind the entrance; otherwise, the controller recognizes that the position of the user is in front of the entrance. Note that the user position is determined accordingly from the relation between the image area and the direction of appearance of the fingers and the recognition of the user's position is not limited to this embodiment.

Then the operation of the controller proceeds to step 3006. The controller checks the recognized cue sign action and the user's position against data stored in the association storage to determine a control operation and sends out a control signal for the associated equipment to be controlled. Note that while the controller used here sends out a control signal when the cue sign makes a predetermined action, the controller of the present disclosure is not limited to this. The controller may be configured so that after the cue sign recognition 3003, the controller skips the cue sign action recognition 3004 and sends out an operation control signal for the previously-associated equipment to be controlled for the cue sign.

5000 in FIG. 5 indicates an association data structure stored in the association storage provided in the memory 2003.

The association data structure includes user's position 5001, cue sign action 5002 and associated operation 5003. As illustrated in 5004, when the user is in front of the entrance and the controller recognizes the action of waving a right hand paper sign, the controller sends a lighting turn-on signal to the lighting controlling device of the lighting equipment. The controller determines the user's position by a direction of the hand which appears in the image capturing area.

As illustrated in 5005, when the user is in front of the entrance and the controller recognizes the action of sweeping a right hand paper sign upward, the controller sends a signal to turn up the lighting to the lighting controlling device of the lighting equipment. As illustrated in 5006, when the user sweeps the right hand paper sign downward, the controller sends a signal to turn down the lighting to the lighting controlling device of the lighting equipment.

The controller continuously turns up or down the lighting in response to successive sweep actions. Accordingly, the user perceives the intensity of lighting changing with the upward or downward sweep of the user's fingers and can stop the action at the moment when the desired intensity of the lighting is reached. This has the effect of enabling the user to perform desired lighting intensity control.

While operations of the lighting equipment, the shade and the air conditioner are illustrated as the operations of pieces of equipment controlled by the controller, the operations of equipment to be controlled in the present disclosure are not limited to these; the present disclosure can also be applied to operations of pieces of equipment such as control of the sound volume of a speaker, the color or the volume of lighting, the temperature, humidity, or wind strength of an air conditioner, the amount of opening of a curtain, shade or window, the reclining angle of a chair, opening and closing a door, locking and unlocking a door lock, answering a telephone, video phone or intercom, calling an elevator, turning on and off a ventilator.

Furthermore, the directions of sweeping are not limited to up-and-down direction as described above; the sweeping directions may be changed accordingly to side-to-side, for example, depending on the site condition and the changed directions may be used with an embodiment of the present disclosure.

Figure 20:
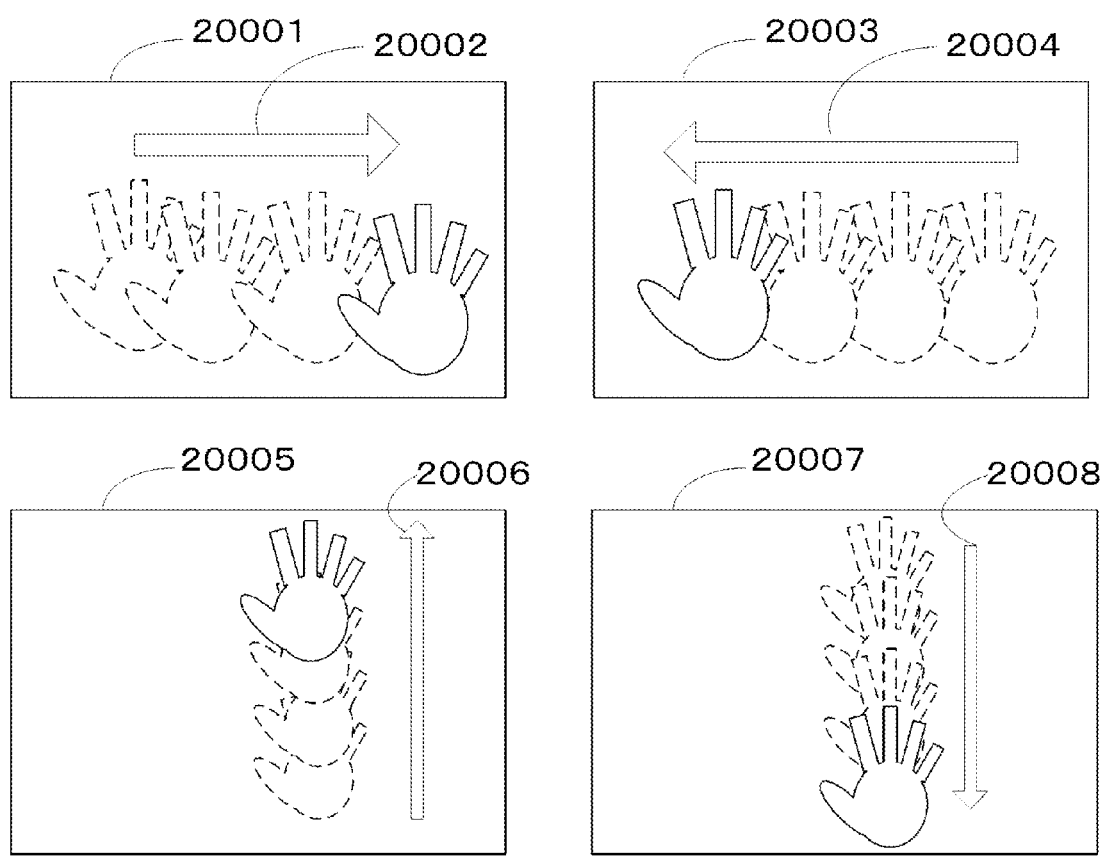
FIG. 20 is conceptual drawings illustrating sweep actions in an image capturing area.

FIG. 20 is conceptual drawings illustrating sweep actions. Conceptual drawing 20001 illustrates a rightward sweep action in the image capturing area of the image sensor unit. Arrow 20002 indicates the movement of a hand sweeping rightward. Conceptual drawing 20003 illustrates a leftward sweep action in the image capturing area of the image sensor unit. Arrow 20004 indicates the movement of the hand sweeping leftward. 20005 illustrates an upward sweep action in the image capturing area of the image sensor unit. Arrow 20006 indicates the movement of the hand sweeping upward. 20007 illustrates a downward sweep operation in the image capturing area of the image sensor unit. Arrow 20008 indicates the movement of the hand sweeping downward.

When the user is behind the entrance, the user can control roll-up and roll-down operations of the shade, instead of operations of the lighting equipment, by the same sweep action with the right hand paper sign as illustrated in 5007 and 5008.

In this way, the use of the controller that changes from one piece of controlled equipment to another in accordance with the user's position with respect to the image sensors provides the user with the convenience of being able to control many pieces of equipment and operations by using a few cue signs and actions. The number of shapes that can be ergonomically easily formed and can be relatively reliably recognized by image recognition is limited. The function of changing from one piece of controlled equipment to another in accordance with the user's position is highly effective in enabling the controller to control many pieces of equipment.

FIG. 18 is a flowchart illustrating operations of the controller 1010, 1011 and 1012. When the controllers are turned on, a program implementing operations of each of the controllers is executed in the control circuit and the image sensor unit of each of the controllers and the controlling device of controlled equipment are activated to start the operation.

At step 18001, each controller obtains through-the-lens-images generated by the image sensor unit at predetermined intervals.

Then at step 18002, the controller performs detection of a shape formed by fingers from the obtained through-the-lens images. The detection of the shape formed by fingers is performed accordingly by using a well-known analysis method such as skin color pattern matching through analysis of color components in the image or edge extraction. Note that the detection of the shape formed by fingers includes the step by the controller of analyzing a plurality of through-the-lens images generated in a predetermined period of time and complementing a plurality of results of the analysis with one another.

The controller determines whether or not there is a shape formed by fingers. When the determination is "No", the operation of the controller returns to the start; when the determination is "Yes", the operation of the controller proceeds to step 18003.

At step 18003, the controller performs recognition of a cue sign stored beforehand in the memory 2013, 2023 or 2033 associated with each controller.

The recognition of a cue sign by the controller is accomplished by executing steps similar to the steps for the controller 1004 described previously.

When the cue sign recognition in the controller is not successful, it is determined that there is no cue sign and the operation of the controller returns to the start. When the cue sign recognition is successful and it is determined that there is a cue sign, the operation of the controller proceeds to step 18004.

At step 18004, the controller performs recognition of a predetermined action of the cue sign stored in an association storage provided in the memory 2013, 2023 or 2033 associated with each controller.

When no action of the cue sign is detected by the controller, the operation of the controller returns to the start; when an action of the cue sign is detected, the operation proceeds to step 18005, where the controller sends out a control signal for the associated equipment to be controlled.

While the controller herein is configured to send out a control signal when the controller recognizes a predetermined action of the cue sign, the controller of the present disclosure is not limited to this. The controller may be configured to send out a control signal for an operation of controlled equipment that has been associated with a predetermined cue sign beforehand simply by recognizing the cue sign.

5010, 5020 and 5030 in FIG. 5 illustrate association data structures stored in association storages provided in the memories 2013, 2023 and 2033, respectively.

These diagrams conceptually illustrate structures including, as constituent elements thereof, actions of cue signs 5011, 5021 and 5031 and operations 5012, 5022 and 5032 associated with the actions.

5013 to 5016, 5023 and 5024, and 5033 to 5036 illustrate control operations performed by the respective controllers for their corresponding pieces of equipment or facilities.

As a variation of the first embodiment, a controller that employs a thermal image sensor will now be described. While an ordinary image sensor is used as the image sensor unit in the first embodiment, a thermal image sensor may be used instead. Recognition of a shape and an action is accomplished by steps similar to the steps described previously.

The thermal image sensor is capable of generating a clear image of a shape formed by fingers even in darkness. Accordingly, the thermal image sensor enables provision of a controller that reliably works in a dark room where the lighting is turned off.

Second Embodiment

A second embodiment has a configuration in which a controller of the present disclosure is built in a handheld information terminal with built-in camera.

Figure 6:
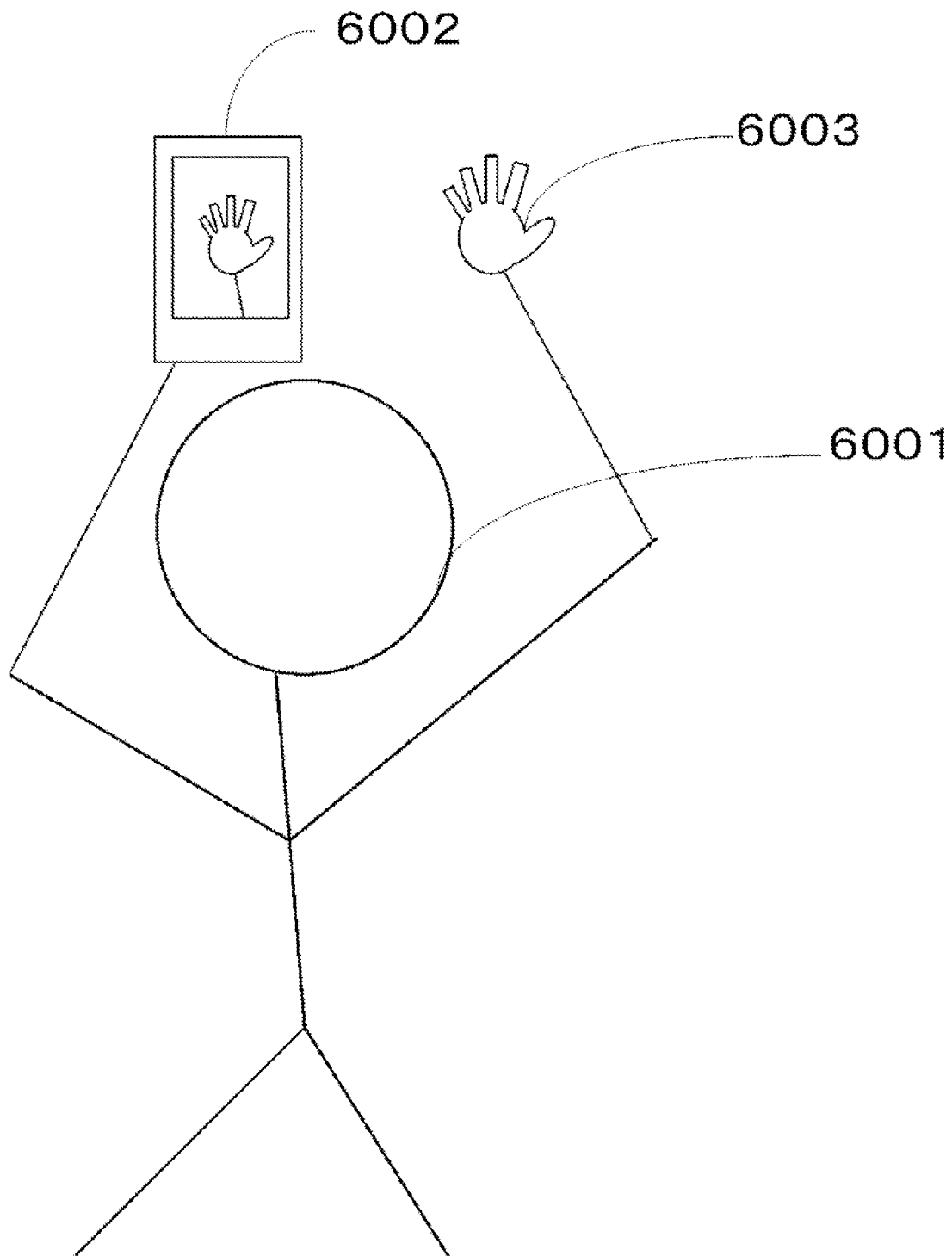
FIG. 6 is a conceptual drawing of a user operating a handheld information terminal with built-in camera of the present disclosure.

FIG. 6 is a conceptual drawing of a user operating a handheld information terminal with built-in camera in which a controller of the present disclosure is used.

The control function of the controller is implemented by a preinstalled control program such as firmware being executed by a processor or control circuit of an information terminal with built-in camera and cooperating with devices such as an image sensor unit constituting the information terminal with built-in camera. Such programs are recorded on a computer-readable recording medium, are read from the recording medium by the processor or the control circuit, and are executed in response to an operation by a user or a signal from a device constituting the information terminal with built-in camera.

Figure 7:
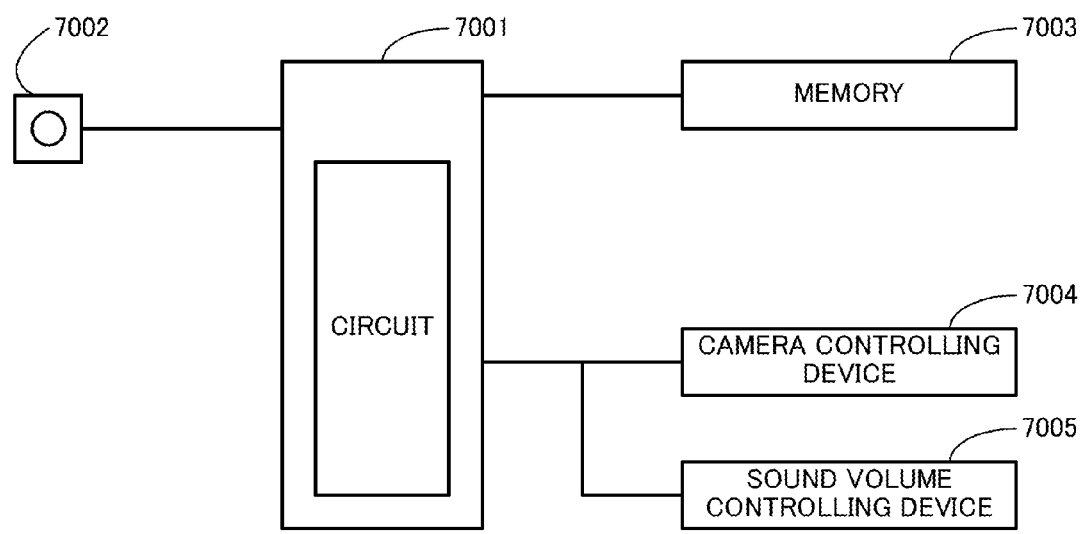
FIG. 7 is a block diagram of the controller and various devices of the terminal.

FIG. 7 is a block diagram of a controller and devices of the terminal.

7001 denotes a controller circuit, which may be a part of the circuitry of the terminal.

7002 denotes an image sensor unit built in the terminal. A controller configured to use thermal images captured by a thermal image sensor unit built in the terminal to recognize a cue sign may be used as one controller of the present disclosure.

7003 denotes a memory in which a cue sign storage and an association storage are included. The memory may be a part of the memory of the terminal.

7004 denotes a controlling device of the built-in camera of the terminal which controls operations such as a shutter operation.

7005 denotes a sound volume controlling device which controls the sound volume of a speaker built in the terminal.

The flow of the operation of the controller and the configuration of the cue sign storage are similar to those of the first embodiment.

FIG. 8 illustrates a data structure of the association storage according to the second embodiment. Cue sign actions are associated with release, zoom-up and zoom-down operations which are typical of camera control, and "increase the sound volume" and "decrease the sound volume", which are operations typical of speaker control.

Operations of equipment controlled by the controller of the present disclosure are not limited to the associated operations employed herein; any operations can be employed appropriately according to the nature of the equipment of the equipment to be controlled.

Furthermore, the directions of sweep actions are not limited to the upward and downward sweep actions illustrated in FIG. 8; other sweep actions such as rightward and leftward sweep actions may be employed.

While the controller of this embodiment controls a handheld information terminal with built-in camera, the equipment to be controlled in the present disclosure is not limited to this; the equipment to be controlled may be a digital camera, a game machine or the like.

A controller that employs a thermal image sensor will now be described. While an image sensor built in an information terminal is employed as an image sensor unit in the second embodiment, the image sensor unit may be a thermal image sensor separately incorporated in the terminal as noted previously in the present disclosure. Recognition of shapes and actions is implemented by employing steps similar to the steps described previously.

The thermal image sensor is capable of generating a clear image of a shape formed by fingers even in darkness. Accordingly, the thermal image sensor enables provision of a controller that reliably works in a dark room where the lighting is turned off.

Third Embodiment

In third embodiment, a control device of the present disclosure is built in a television set. FIG. 9 is a conceptual drawing of a user operating a television set to which a control device of the present disclosure is applied. In this figure, the user 9001 forms a cue sign 9004 and directs the cue sign to an image sensor unit 9003 provided for a television set 9002.

Figure 10:
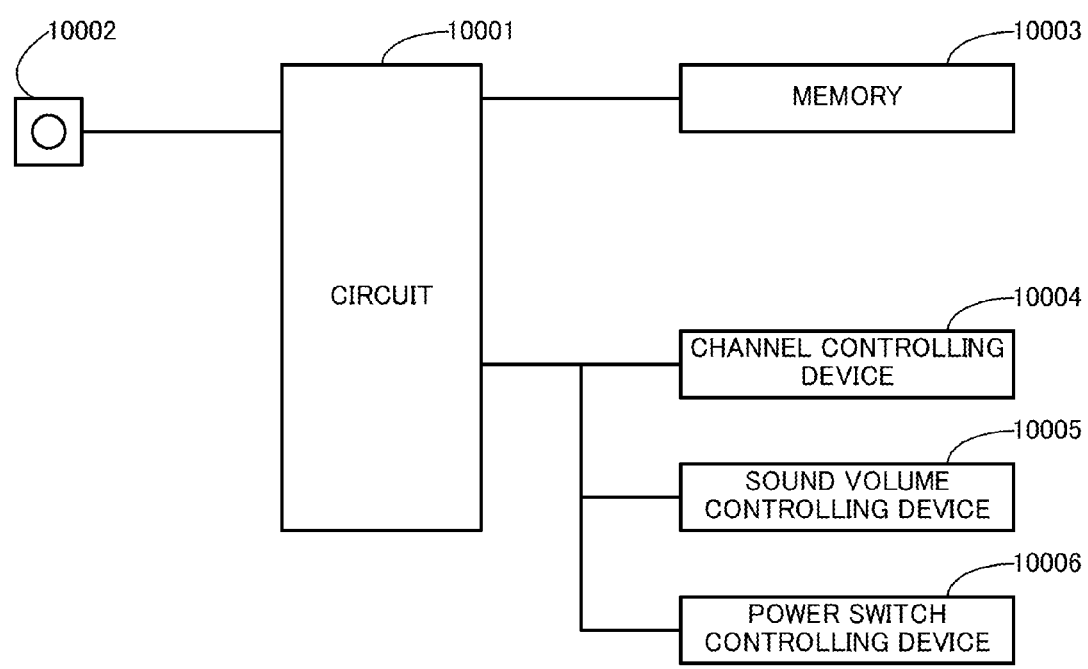
FIG. 10 is a block diagram of a controller and various devices.

FIG. 10 is a block diagram illustrating a controller and various devices of the terminal.

10001 denotes a controller circuit. The circuit may be implemented as a part of the circuitry of the terminal.

10002 denotes the image sensor unit.

10003 denotes a memory, in which a cue sign storage and an association storage are provided.

10004 denotes a channel controlling device, which controls channel switching.

1005 denotes a sound volume controlling device, which controls the sound volume of a speaker.

10006 denotes a power switch controlling device, which controls turning on and off the power for the television set.

The operation flow of the controller and the configuration of the cue sign storage are similar to those of the first embodiment.

FIG. 11 illustrates a data structure of an association storage according to the third embodiment. Cue sign actions are associated with power switch operations and channel-up and channel down operations which are operations typical of television set control, and "increase the sound volume" and "decrease the sound volume", which are operations typical of speaker control.

Operations of equipment controlled by the controller of the present disclosure are not limited to the associated operations employed herein; other operations such as leftward and rightward sweeps may be employed accordingly.

While the equipment controlled by the controller here is a television set, the equipment controlled in the present disclosure is not limited to this; the equipment controlled may be a radio, a game machine or the like.

As a variation of the third embodiment, a controller that employs a thermal image sensor will now be described. While an ordinary image sensor is used as the image sensor unit in the third embodiment, a thermal image sensor may be used instead. Recognition of a shape and an action is implemented by employing steps similar to those described previously.

Since the thermal image sensor is capable of generating a clear image of a shape formed by fingers even in darkness, the thermal image sensor enables provision of a controller that reliably works in a dark room where the lighting is turned off.

Fourth Embodiment

In a fourth embodiment, a controller apparatus of the present disclosure is built in a game clock.

Figure 12:
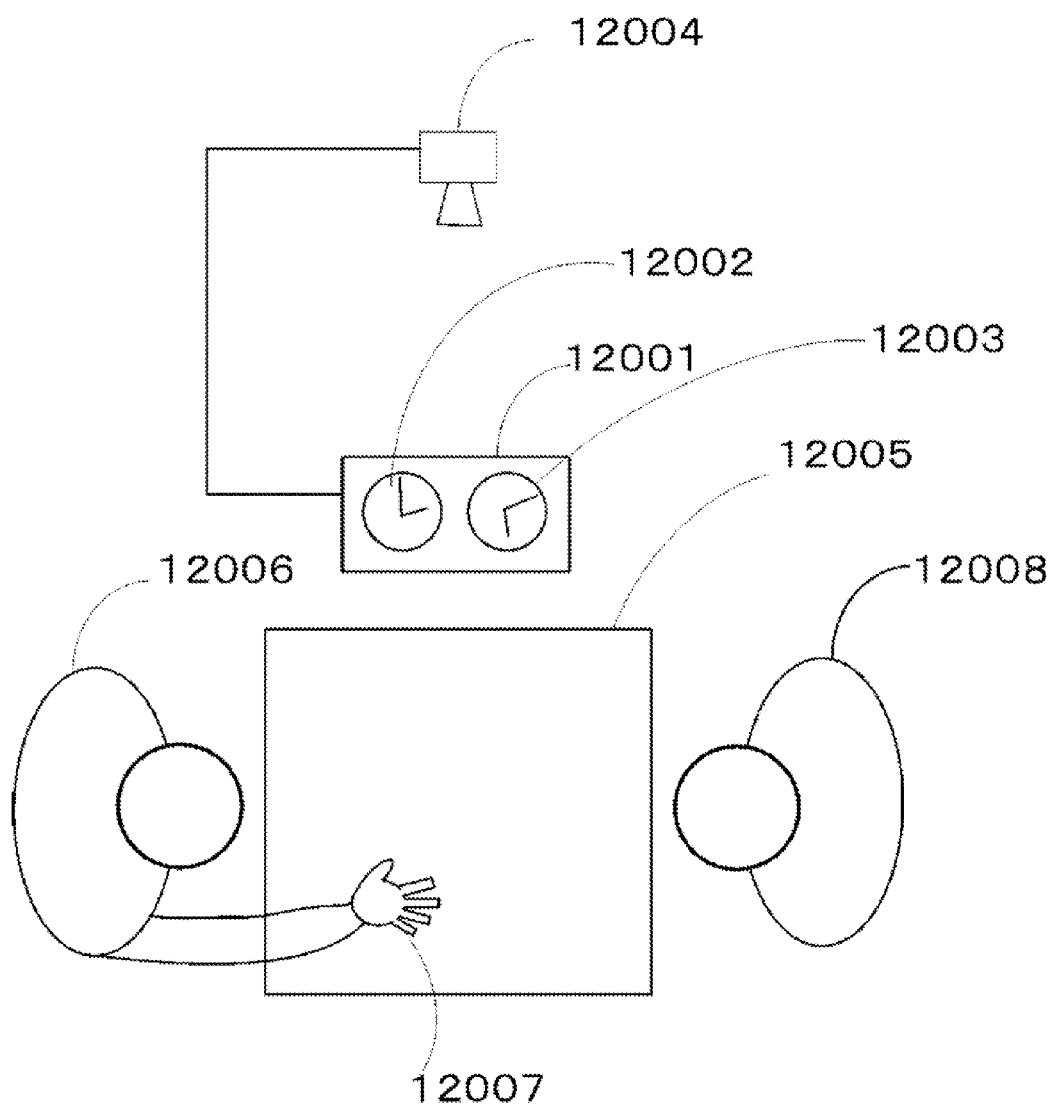
FIG. 12 is a conceptual drawing of a game using a game timer of the present disclosure.

FIG. 12 is a conceptual drawing of a game played using a game clock to which a controller apparatus of the present disclosure is applied. While the game played here is chess, the game to which the present disclosure can be applied is not limited to chess. A game clock according to the present disclosure may be used in other board games, such as shogi, go and the like, that involves measuring wait time.

In the figure, a game clock 12001 including a white's timer 12002 and a black's timer 12003 is provided. In addition, a camera 12004 in which chessboard 12005 is set as the image capturing area is provided. 12006 denotes a white side player forming a paper sign 12007 as a cue sign after completing a move and 12008 is a black side player.

Since the chessboard is set as the image capturing area, a person who manages the controller apparatus can set an image of the background of a cue sign formed by fingers in the controller apparatus beforehand to allow the controller apparatus to extract the shape formed by fingers quickly and accurately.

Figure 13:
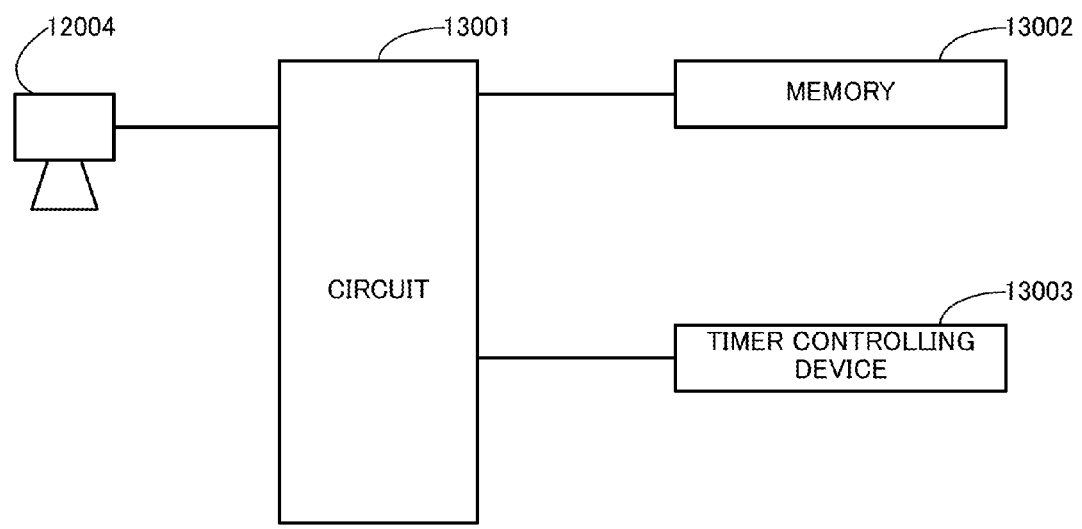
FIG. 13 is a block diagram of a controller and various devices.

FIG. 13 is a block diagram illustrating the relation between the camera 12004 and various devices of the controller.

13001 denotes a controller circuit.

13002 denotes a memory, in which a cue sign storage and an association storage are provided.

13003 denotes a timer controlling device, which controls operations such as start and stop of the timers 12002 and 12003.

Figure 17:
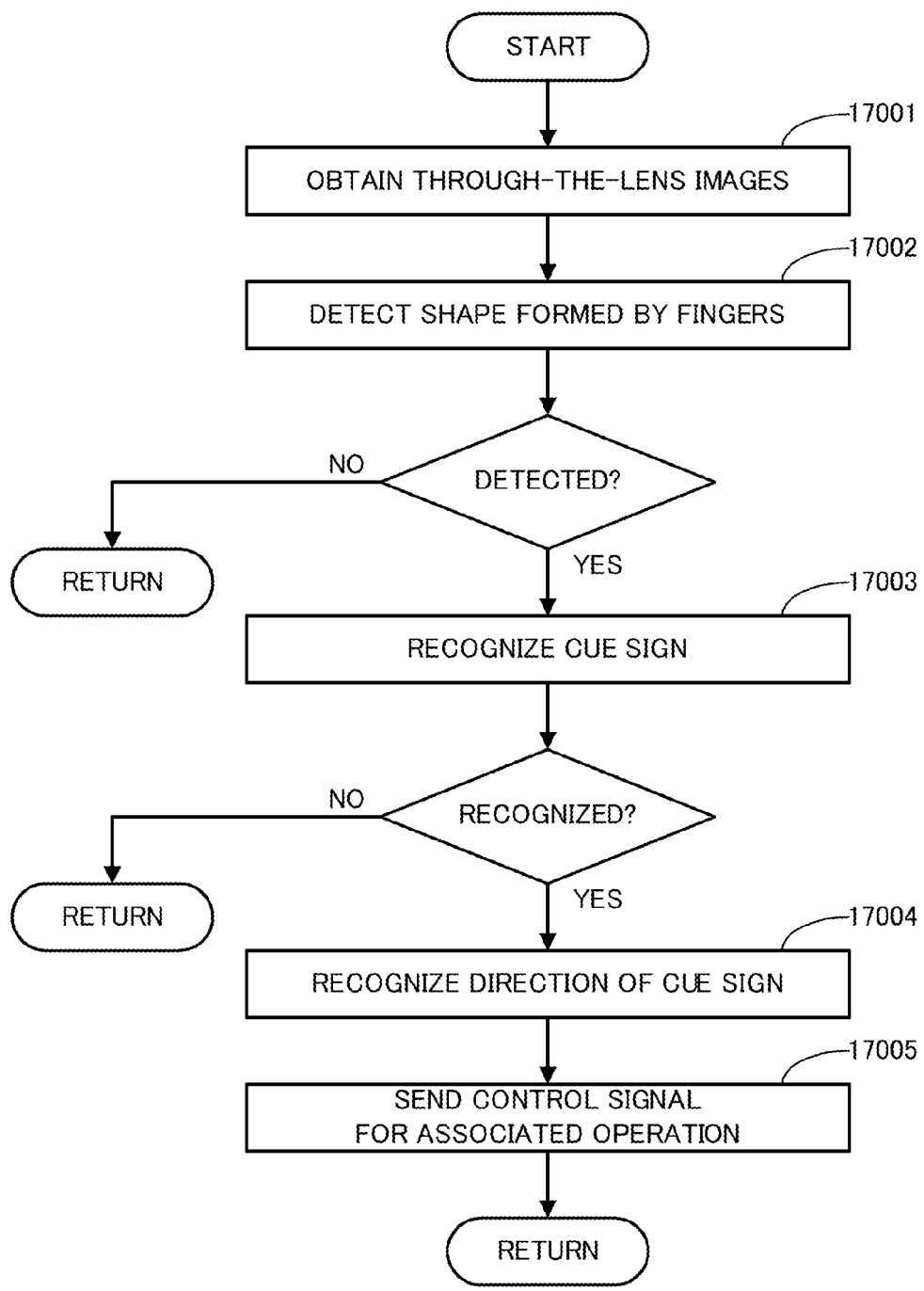
FIG. 17 is a flowchart illustrating an operation of a controller for a game clock.

FIG. 17 is a flowchart of an operation of the controller built in the game clock. When the game clock is powered on, a program executing operations of the controller is executed in the control circuit and an image sensor unit and a controlling device in the equipment to be controlled are activated to start the operation of the controller.

At step 17001, the controller obtains through-the-lens-images generated by the image sensor unit at predetermined intervals.

Then, at step 17002, the controller performs detection of a shape formed by fingers from the through-the-lens images obtained. The detection of the shape formed by fingers is performed accordingly by using a well-known analysis method such as skin color pattern matching through analysis of color components in the image or edge extraction. Note that the detection of the shape formed by fingers includes the step of analyzing a plurality of through-the-lens images generated in a predetermined period of time and complementing a plurality of results of the analysis with one another.

The controller determines whether or not there is a shape formed by fingers. When the determination is "No", the operation of the controller returns to the start; when the determination is "Yes", the operation of the controller proceeds to step 17003.

At step 17003, the controller performs recognition of a cue sign stored beforehand in the memory 13002.

The recognition of a cue sign by the controller is accomplished by executing steps similar to the steps in the first embodiment.

When the cue sign recognition is not successful, the controller determines that there is not a cue sign and the operation of the controller returns to the start. When the cue sign recognition is successful and the controller determines that there is a cue sign, the operation of the controller proceeds to step 17004.

At step 17004, the controller performs recognition of the direction of the cue sign, which will be described later.

When the direction of the cue sign is recognized, the operation of the controller proceeds to step 17005, where a control signal for an associated operation is sent out.

FIG. 14 illustrates a data structure of an association storage according to the fourth embodiment. 14001 denotes the direction of a shape formed by fingers appearing in the image capturing area of the camera 12004. There are three directions: from the center 14004, from the white's side 14005, and from the black's side 14006.

14002 denotes types of cues signs. A "left hand paper sign" which is a shape formed by extended fingers and thumb of a left hand and a "right hand paper sign" which is a shape formed by extended fingers and thumb of a right hand are employed.

The combinations of the three directions and the two cue signs are associated with operations 14003. Specifically, the "left hand paper sign from the center" is associated with starting the white's timer; the right hand paper sign from the white's side" is associated with stopping the white's timer and starting the black's timer; and the "right hand paper sign from the black's side" is associated with stopping the black's timer and starting the white's timer.

These operations are specific to a game clock that are set in accordance with the rules of a board game. Associated operations are not limited to the operations employed here; other necessary associations may be used in accordance with the rules of a game of interest.

Figure 15:
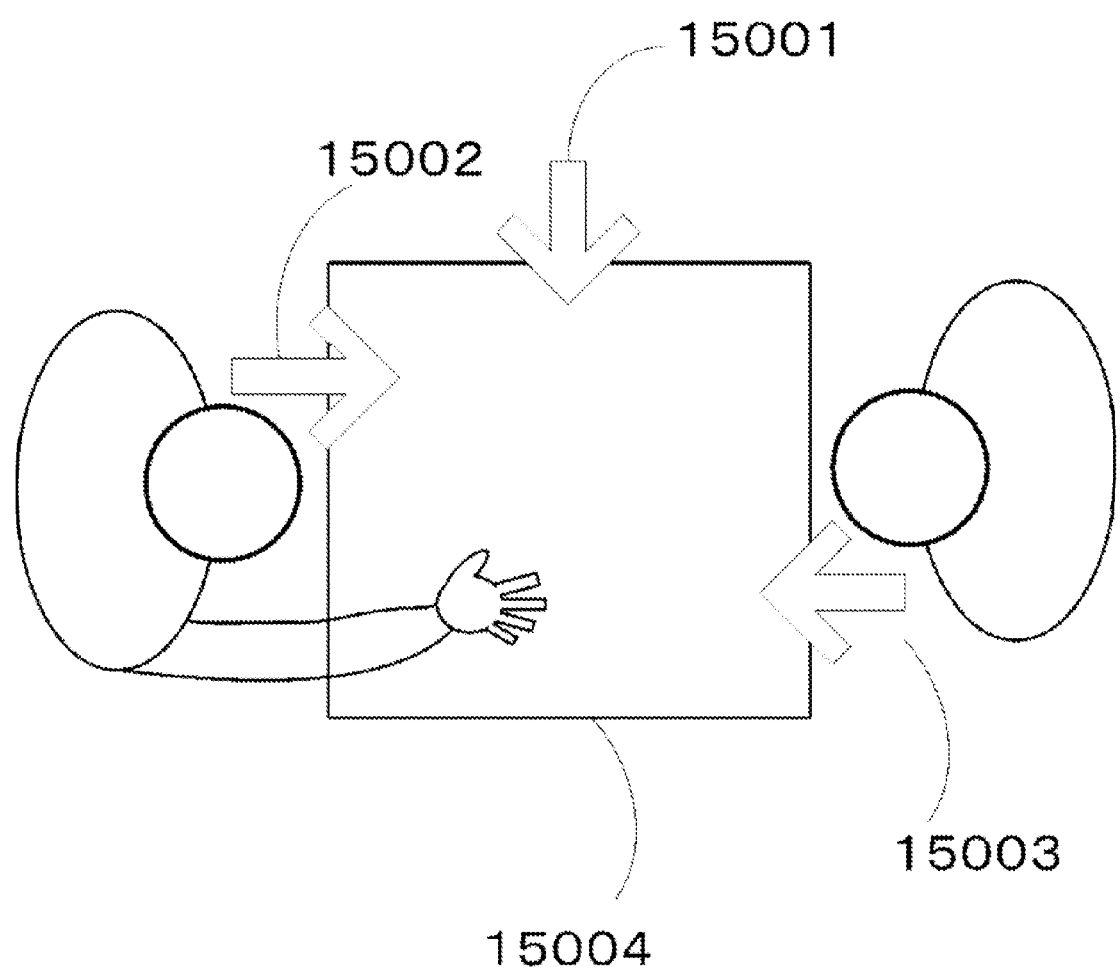
FIG. 15 is a conceptual drawing of directions of hands.

FIG. 15 is a diagram based on the concept of the directions described above.

Arrow 15001 indicates "from the center", arrow 15002 indicates "from the white's side" and arrow 15003 indicates "from the black's side".

15004 indicates the image capturing area set at the chess board. The orientations of the upper, lower, left and right sides of a rectangle forming the area are adjusted so that the sides are substantially perpendicular to the arrows described above.

As a variation of the fourth embodiment, a controller that employs a thermal image sensor will now be described.

While an ordinary image sensor is used as the image sensor unit in the fourth embodiment, a thermal image sensor may be used instead. Recognition of a shape and an action is accomplished by steps basically similar to the steps described previously.

The thermal image sensor is capable of sensing shapes formed by fingers accurately and quickly from the difference in temperature between a game board, which serves as the background, and the fingers forming a cue sign. Since the temperature difference is sufficiently large in an ordinary environment, the controller can generate a clear image of the shape formed by fingers even when game pieces or go stones are intricately placed on the board. Thus, a controller for a game clock that is contactless and yet works fast and reliably can be provided.

It should be understood that the embodiments disclosed herein are in all respects illustrative and not restrictive. The scope of the present disclosure is indicated by the claims rather than by the foregoing description and all changes which come within the meaning and range of equivalency of the claims are therefore intended to be embraced therein.

This application is based upon and claims the benefit of priority from the prior Japanese Patent Application No. 2012-219274 and No. 2013-005279, the entire contents of which are incorporated herein by reference.

INDUSTRIAL APPLICABILITY

The present disclosure is applicable to any apparatus that can communicate with the controller. The controller of the present disclosure can be used in a wide range of applications from indoor and outdoor facilities and equipment to information terminals typified by smartphones.

REFERENCE SIGNS LIST

2001 Image sensor unit
2002 Controller circuit
2003 Memory

The invention claimed is:

1. A controller connected to an image sensor, comprising:
 (a) reference data comprising four indentations each of which is formed between extended fingers, a positional relation between the extended fingers that represent projections, and a feature relating to the thumb, the indentations, the positional relation and the feature being set as biometrics of fingers forming a preselected shape of an open hand with all of the fingers and the thumb extended (hereinafter, the preselected shape is referred to as a cue sign);
 (b) an association storage that associates the cue sign with a predetermined operation of equipment to be controlled and stores the association;

(c) a recognizer that analyzes, at predetermined intervals, images successively generated by the image sensor (hereinafter, the images are referred to as through-the-lens-images) to detect a shape formed by fingers, detects, in the shape, indentations each of which is formed between extended fingers, a positional relation between the extended fingers that represent projections, and a feature relating to the thumb, and compares the indentations, the positional relation and the feature with the biometrics included in the reference data to recognize the cue sign; and (d) a control part that, in response to the recognition of the cue sign, refers to the association storage to emit a control signal for the predetermined operation associated with the recognized cue sign at a predetermined timing.

2. The controller according to claim 1, wherein the predetermined timing is a timing after the recognition and at which the recognition is no longer sensed.

3. The controller according to claim 1, wherein the positional relation is a relative relation obtained by measuring a relative distance from a predetermined position to the tip of each of the fingers and the thumb in an image and the comparison comprises the step of determining whether or not a difference between the positional relation of a shape in which the relative relation between the distances is detected and a relative positional relation included in the biometrics is within a preset range.

4. The controller according to claim 3, wherein the predetermined position is the centroid of the cue sign.

5. The controller according to claim 3, wherein the feature of the thumb is that the relative distance from the centroid of the cue sign to the tip of the thumb is the shortest among the other relative distances.

6. The controller according to claim 1, wherein the positional relation is an interior angle between the thumb and the forefinger, an interior angle between the forefinger and the middle finger, an interior angle between the middle finger and the ring finger, and an interior angle between the ring finger and the little finger.

7. The controller according to claim 6, wherein the feature of the thumb is that the interior angle between the thumb and the forefinger is greater than the other interior angles.

8. The controller according to claim 1, wherein the association with a predetermined operation of the equipment to be controlled is association of the predetermined operation with at least one action selected from the group including an action of waving the cue sign, an action of sweeping the cue sign in a predetermined direction, and a combination of the cue signs formed with both hands.

9. The controller according to claim 1, wherein the biometrics comprises a feature of a right hand cue sign and a feature of a left hand cue sign, the recognition comprises the step of determining whether the hand is a right hand or left hand, and the right hand cue sign and the left hand cue sign are associated with different operations in the association with a predetermined operation of the equipment to be controlled.

10. The controller according to claim 8, wherein the controller is a volume controller controlling at least one volume selected from the sound volume of a speaker, the color or the amount of light of lighting equipment, the temperature, the humidity or the wind strength of an air conditioner, the amount of opening of a curtain, a shade or a window, and the reclining angle of a chair and the volume is increased or decreased along with the action of sweeping.

11. The controller according to claim 1, wherein equipment to be controlled by the controller is at least one selected from the group including a television set, a radio, a game machine, a digital camera and a mobile phone with built-in camera.

12. The controller according to claim 1, wherein the controller performs at least one indoor or outdoor equipment control selected from the group including opening and closing a door, locking and unlocking a door lock, answering a telephone, a video phone or an intercom, calling an elevator, and turning on and off a ventilator.

13. The controller according to claim 1, wherein the controller comprises changer that changes equipment to control in accordance with the position of a user with respect to the image sensor.

14. The controller according to claim 1, wherein control object by the controller is a game clock for at least one board game selected from the group including chess, shogi and go.

15. The controller according to claim 14, wherein an image capturing area of the image sensor is preset to include a board for the board game.

16. The controller according to claim 14, wherein the predetermined operation is associated according to the direction from which a hand forming the cue sign appears in the image capturing area.

17. The controller according to claim 14, wherein the predetermined operation is associated according to the direction from which a hand forming the cue sign appears above the board.

18. The controller according to claim 1, wherein the controller is a controller connected to a thermal image sensor and the analysis and the detection of the shape formed by fingers at the predetermined intervals are performed on a thermal image.

* * * * *